United States Patent Office 3,562,245
Patented Feb. 9, 1971

3,562,245
BASIC QUINALDINIUMAZOINDOLE DYESTUFFS
Reinhard Mohr and Johann Ostermeier, Offenbach (Main),
Germany, assignors to Farbwerke Hoechst Aktiengesellschaft vormals Meister Lucius & Bruning, Frankfurt am Main, Germany, a corporation of Germany
No Drawing. Filed Apr. 4, 1968, Ser. No. 718,921
Claims priority, application Germany, Apr. 8, 1967,
F 52,071
Int. Cl. C09b 29/36; D06p 1/04, 1/10
U.S. Cl. 260—146                     5 Claims

ABSTRACT OF THE DISCLOSURE

Azo-dyestuffs of the formula

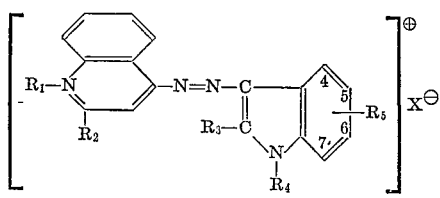

wherein $R_1$ represents methyl or ethyl, $R_2$ represents methyl, $R_3$ represents hydrogen, methyl or phenyl, $R_4$ represents hydrogen or methyl, $R_5$ represents hydrogen, fluorine, chlorine, bromine, lower alkyl, lower alkoxy, cyano or nitro, and $X^-$ represents an anion, said dyestuffs being suitable for the dyeing or printing of tanned cellulose fibres, silk, leather or fully synthetic fibres and yielding dyeings or prints of a very good tinctorial strength and of very good fastness properties to light and to wet processing.

---

Patent application No. 516,763, now abandoned, relates to basic azo-dyestuffs which are free from sulfonic acid and carboxylic acid groups, the cation of which corresponds to the general Formula I

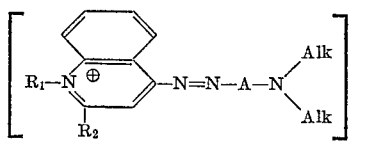

in which $R_1$ and $R_2$ represent lower alkyl groups, Alk represents lower alkyl groups which may be substituted or form a ring, and A stands for a radical of the benzene or naphthalene series.

The invention relates also to a process for preparing these basic azo-dyestuffs by (a) Coupling a diazonium compound of a quaternary amine of the general Formula II

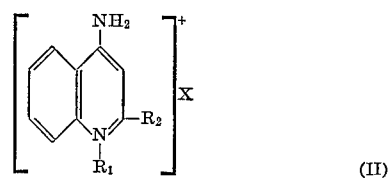

in which $R_1$ and $R_2$ are defined as above, and X represents an anion, with a coupling component which couples in paraposition to the $(Alk)_2N$ group and corresponds to the Formula III

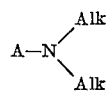

in which A and Alk are defined as above, or (b) By treating an azo-dyestuff of the general Formula IV

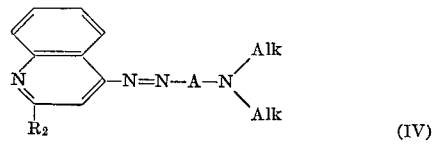

in which A, $R_2$ and Alk are defined as above, with quaternating agents.

Azo-dyestuffs according to the invention herein may have the formula

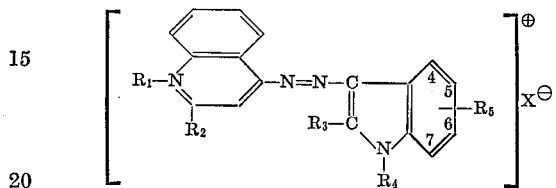

wherein $R_1$ represents methyl or ethyl, $R_2$ represents methyl, $R_3$ represents hydrogen, methyl or phenyl, $R_4$ represents hydrogen or methyl, $R_5$ represents hydrogen, fluorine, chlorine, bromine, lower alkyl, lower alkoxy, cyano or nitro, and $X^-$ represents an anion.

The dyestuffs obtained according to the process of the invention are suitable for dyeing or printing tanned cellulose fibers, silk, leather or fully synthetic fibers such as acetate rayon or polyamide fibers, in particular however fibers containing polyacrylonitrile or polyvinylidene cyanide. The dyeings obtainable on these fibers are distinguished by brilliant blue tints and by very good fastness properties to light and wet processing.

On further developing the idea of invention, now it has been found that valuable basic azo-dyestuffs can also be obtained which are free from sulfonic and carboxylic acid groups and the cation of which corresponds to the general Formula I

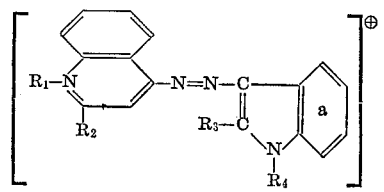

in which $R_1$ and $R_2$ represent lower alkyl groups, $R_3$ and $R_4$ represent hydrogen, lower alkyl radicals or aryl radicals and the benzene nucleus $a$ may contain non-ionogenic substituents, by altering the process of patent application No. 516,763 in a way such that (a) The diazonium compound of a quaternary amine of the general Formula II

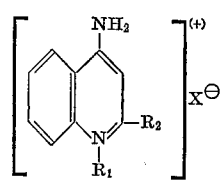

in which $R_1$ and $R_2$ are defined as above and X represents an anion, is coupled with a coupling component of the general Formula III

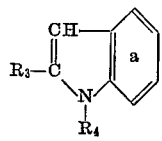

in which $R_3$ and $R_4$ as well as $a$ are defined as above, or (b) An azo-dyestuff of the general Formula IV

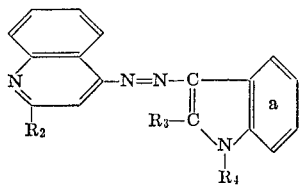

in which $R_2$, $R_3$ and $R_4$ are defined as above, is treated with quaternating agents.

The quaternary amines of Formula II used for method (a) can be obtained by treating amines of Formula V

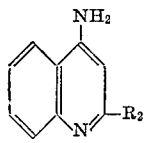

with quaternating agents, such as alkyl or aralkyl halides, halogen acetamides, β-halogen propionitriles, halogen hydrides, or alkyl or aralkyl esters of the sulfuric acid or of organic sulfonic acids, preferably in organic solvents, such as alcohols, ketones, esters, carboxylic acid amides, hydrocarbons or halogenated hydrocarbons.

As coupling component of Formula III there may be used indoles, such as 2-alkyl indoles, 2-aryl indoles, 1,2-dialkyl indoles, 1-alkyl-2-aryl indoles or 1-alkyl indole, the alkyl and aryl radicals as well as the benzene radical $a$ may contain non-ionogenic substituents.

The amines of Formula II are diazotized according to known methods, preferably in a 80 to 100% sulfuric acid, if desired in the presence of organic carboxylic acids, such as acetic acid or propionic acid, by means of nitrosylsulfuric acid. Since the diazonium compounds of quaternary amines of Formula II are stable in aqueous solution only to a certain extent, it is of advantage to react the coupling components of Formula III dissolved in a 80 to 100% sulfuric acid. Under these conditions the azo coupling is generally rapid and complete. For the separation of the quaternary dyestuffs it is suitable to dilute the coupling solution with water. Depending on the constitution and solubility of the color salts there may be isolated the salts, such as sulfates, or the double salts, such for example as the zinc chloride double salts; in some cases it may be of advantage to buffer the solution, for example with sodium acetate or to add a salt, for example sodium chloride.

The azo dyestuffs of Formula IV which are used for method (b) can be obtained in known manner by coupling the diazotized amines of Formula V with coupling components of Formula III. A diazotization and coupling method according to method (a) has proved appropriate. The azo dyestuffs are treated with quaternating agents, such as alkyl or aralkyl halides, halogenoacetamides, β-halogenopropionitriles, halogenohydrides, alkyl esters of the sulfuric acid or alkyl or aryl esters of organic sulfonic acids. Appropriate quaternating agents are for example methylchloride-, -bromide, or -iodide, ethyl bromide or -iodide, propylbromide or -iodide, benzylchloride or -bromide, chloroacetamide, β-chloropropionitrile, ethylene chlorohydrine, dimethylsulfate, diethylsulfate, benzenesulfonic acid methyl esters, β-toluenesulfonic acid ethyl-, -propyl or -butyl esters. Quaternization is suitably effected in an organic solvent, for example in a hydrocarbon, chlorinated hydrocarbon or nitro hydrocarbon, such as benzene, toluene, xylene, chlorobenzene or nitrobenzene, in an acid amide or acid anhydride, such as acetic acid anhydride or dimethyl formamide, in dimethyl sulfoxide or in a ketone, such as methylethyl ketone. Instead of an organic solvent there may also be used an excess of quaternating agents. Quaternization is effected at elevated temperatures, if desired under pressure. The most favorable conditions for each individual case can be easily determined by a preliminary test.

The dyestuffs obtainable according to the process of the invention contain as anion preferably the radical of a strong acid, for example of the sulfuric acid or the semiesters thereof, an arylsulfonic acid or a halogen hydracid. These anions which are added in the process of the invention may also be replaced by anions of other acids, for example of the phosphoric acid, acetic acid, oxalic acid, lactic acid or tartaric acid. The dyestuffs may, moreover, be isolated in form of the double salts with zinc or cadmium halides.

The novel dyestuffs are appropriate for the dyeing or printing of tanned cellulose fibers, silk, leather or fully synthetic fibers, such as acetate rayon, polyamide fibers or acid modified polyester fibers, in particular fibers containing polyacrylonitrile or polyvinylidene cyanide. The very clear red dyeings obtainable on these fibers are distinguished by a very good tinctorial strength and by very good fastness properties to light and wet processing.

As to a change of the pH-value of the dyebath, the dyestuffs are in general largely unsusceptible and may therefore be used in weakly acid as well as in strongly acid bath. Moreover, they are stable at temperatures above 100° C., such as they are used in high-temperature dyeing. Under normal dyeing conditions wool is completely resisted by the dyestuffs.

In comparison with the dyestuffs described in patent application No. 516,763 the dyestuffs obtained according to the process of the present invention are distinguished by an improved fastness to decatizing and cross-dyeing on polyacrylonitrile fiber materials.

The following examples serve to illustrate the invention but they are not intended to limit it thereto; parts indicated being by weight unless otherwise stated.

EXAMPLE 1

7.1 parts of 1,2-dimethyl-4-aminoquinaldinium-methyl sulfate are dissolved in 12.5 parts by volume of a 78% sulfuric acid. The solution is cooled to 0–5° C. and 3.8 parts by volume of a 41.8% nitrosylsulfuric acid are added dropwise at this temperature. Stirring is continued for 15 minutes at about 5–10° C., about 1 part of aminosulfo acid is added, and then a solution of 3.8 parts of 1,2-dimethyl indole in 5 parts by volume of glacial acetic acid and 5 parts by volume of sulfuric acid is added dropwise. After a period of 30 minutes the coupling mixture is poured onto 100 parts of ice and 100 parts by volume of water and, after the addition of 5 parts by volume of a 70% zinc chloride lye and 25 parts of common salt, the zinc chloride double salt of the dyestuff cation of the formula

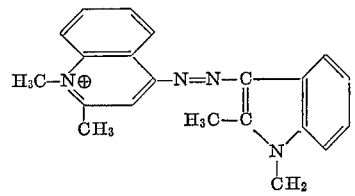

is precipitated. The dyestuff is filtered with suction, washed with a dilute common salt solution and dried at 60° C. 10.3 parts of a dark red powder are obtained which dissolves in water with red color.

1 g. of the dyestuff is mixed with 2.5 g. of a 50% acetic acid and dissolved in 6 liters of water. 1 g. of crystallized sodium acetate and 10 g. of calcinated sodium sulfate are added to the dyebath. Subsequently, 100 g. of prewashed yarn of polyacrylonitrile staple fiber are introduced into the dyebath having 60° C., the temperature is slowly risen to 100° C. and the yarn is dyed for one hour at boiling temperature. The bath is then slowly cooled to 70° C., the yarn is rinsed and dried. A blueish red dyeing is obtained having excellent fastness properties to light and very good fastness properties to wet processing.

When using in the above example instead of 3.8 parts of 1,2-dimethyl indole the corresponding amount of 2,5-dimethyl indole, 2-methyl-5-ethoxy indole, 2-methyl-5-chloro indole, 2-methyl-5-nitro indole, 2-methyl-6-cyano indole, 2-methyl-5-bromo indole or 2-methyl-5-fluoro indole, red dyestuffs of similar fastness properties are also obtained.

EXAMPLE 2

3.95 parts of 4-aminoquinaldine are given at 30–40° C. to 12.5 parts by volume of concentrated sulfuric acid. After 30 minutes a clear solution has formed which is cooled to 0.5° C. and diazotized in the course of 15 minutes by dropping in 3.8 parts by volume of a 41.8% nitrosylsulfuric acid. After a period of 15 minutes the diazo solution is added dropwise to a solution consisting of 3.8 parts of 1,2-dimethyl indole and 10 parts by volume of glacial acetic acid, the precipitated dyestuff suspension is stirred for another 60 minutes at 20° C. and poured onto 100 parts of ice and 100 parts by volume of water. The dyestuff of the formula

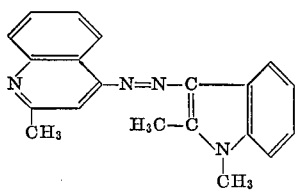

is precipitated by neutralization with an ammonia solution, filtered with suction and washed with water. The damp yellow nutsch cake (13 parts) is azeotropically freed from water in 300 parts by volume of toluene, the solution is cooled to 80–90° C. and stirred for about 4 hours at 80–90° C. with 0.1 part of magnesium hydroxide and 4 parts by volume of dimethyl sulfate. Dark red crystals separate from the solution, the crystals are filtered with suction and dried. About 8 parts of the dyestuff of the formula

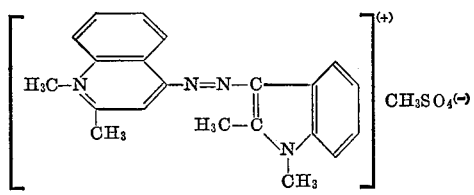

are obtained which dissolves easily in water or dilute acetic acid with red color and which dyes polyacrylonitrile in red shades having very good fastness properties to light and wet processes.

EXAMPLE 3

7.1 parts of 1,2-dimethyl-4-aminoquinolinium-methyl sulfate are dissolved at 20–25° C. in 12.5 parts by volume of a 78% sulfuric acid and diazotized at about 10° C. with 3.8 parts by volume of nitrosylsulfuric acid. After stirring for 15 minutes at about 10° C., a solution of 5 parts of 1-methyl-2-phenyl indole in 20 parts by volume of glacial acetic acid and 5 parts by volume of a 78% sulfuric acid is added dropwise. After about 30 minutes the dyestuff suspension is poured onto 100 parts of ice and 100 parts of water, the zinc chloride double salt of the dyestuff cation of the formula

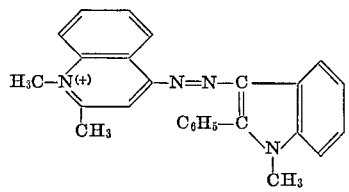

is precipitated with zinc chloride lye and common salt, filtered with suction and dried at 60° C. 18.8 parts of a brown crystal powder are obtained which dissolves in dilute acetic acid with red color.

1 part of the dyestuff is mixed with 2 parts of a 50% acetic acid and dissolved in 6,000 parts by volume of water. 1 part of sodium acetate and 10 parts of calcinated sodium sulfate are added to the dyebath. 100 parts of prewashed fabric of acid modified polyester fibers are introduced into the bath at 60° C., the temperature is slowly risen and the fabric is dyed for one hour at 115° C. The bath is then cooled to about 70° C., the fabric is rinsed and dried. A Bordeaux dyeing is obtained having good fastness properties to light and wet processing.

The following table indicates further dyestuff cations of Formula I obtainable according to the invention, as well as the shades of the dyeings on polyacrylonitrile fibers:

| $R_1$ | $R_2$ | $R_3$ | $R_4$ | $X^-$ | Shade |
|---|---|---|---|---|---|
| Methyl | Methyl | Methyl | Hydrogen | Cl | Yellowish red. |
| Do | do | Phenyl | do | SO$_4$/2 | Red. |
| Ethyl | do | Methyl | Methyl | C$_2$H$_5$SO$_4$ | Red. |
| Do | do | do | Hydrogen | C$_2$H$_5$SO$_4$ | Red. |
| Methyl | do | Hydrogen | do | ZnCl$_3$ | Red. |

We claim:
1. An azo-dyestuff of the formula

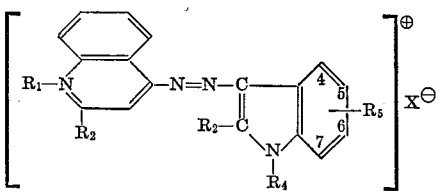

wherein $R_1$ represents methyl or ethyl, $R_2$ represents methyl, $R_3$ represents hydrogen, methyl or phenyl, $R_4$ represents hydrogen or methyl, $R_5$ represents hydrogen, fluorine, chlorine, bromine, lower alkyl, lower alkoxy, cyano or nitro, and $X^-$ represents an anion.

2. The azo-dyestuff of the formula

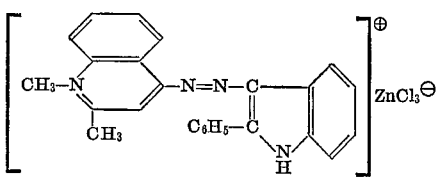

3. The azo-dyestuff of the formula

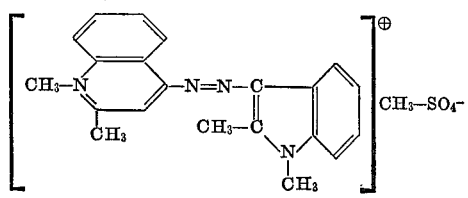

4. The azo-dyestuff of the formula
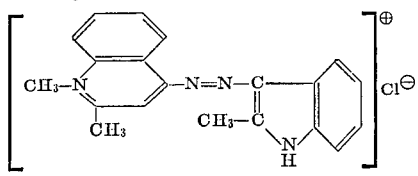
5. The azo-dyestuff of the formula
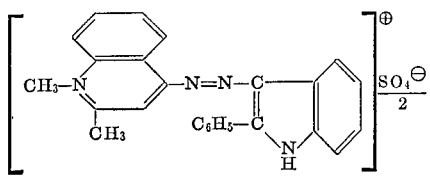
References Cited
UNITED STATES PATENTS
| | | | |
|---|---|---|---|
| 2,893,816 | 7/1959 | Tsang et al. | 260—155X |
| 3,073,813 | 1/1963 | Gross et al. | 260—155X |
| 3,213,080 | 10/1965 | Bloom et al. | 260—155 |
| 3,317,272 | 5/1967 | Wunderlich et al. | 260—155X |
| 3,336,285 | 8/1967 | Towne et al. | 260—155 |
| 3,423,392 | 1/1969 | Wunderlich et al. | 260—155X |
FLOYD D. HIGEL, Primary Examiner
U.S. Cl. X.R.
8—13, 41, 42, 50, 71; 260—155, 288, 319.1, 326.16